Jan. 22, 1952     R. K. SHEWMON     2,583,189
GROUND CONNECTION CLIP FOR MOTOR MOUNTS
Filed April 9, 1949

INVENTOR
RALPH K. SHEWMON
BY Spencer, Hardman and Fehr
HIS ATTORNEYS

Patented Jan. 22, 1952

2,583,189

UNITED STATES PATENT OFFICE 2,583,189

GROUND CONNECTION CLIP FOR MOTOR MOUNTS

Ralph K. Shewmon, Dayton, Ohio, assignor to General Motors Corporation, Detroit, Mich., a corporation of Delaware Application April 9, 1949, Serial No. 86,438

2 Claims. (Cl. 173—324)

This invention relates to a cushioning mounting device for electric machines and a removable static electric charge short-circuiting device therefor. In most installations electric motors and generators are provided with resilient mountings for the purpose of reducing vibration and operating noises. Such resilient mountings generally include rubber which insulates the electric motor or generator from ground, so that static electricity, produced through friction of moving parts such as driving belts or the like, cannot be dissipated to ground. Such an accumulation of static electricity may cause damage to equipment and also offers the hazard of shock to the operator of the equipment.

The present invention has for one of its objects, the provision of a simple and inexpensive grounding element of predetermined electrical characteristics which may easily be applied to the resilient mounting of a motor and readily replaced if necessary, said element forming an escape for static electricity generated in the motor.

Further objects and advantages of the present invention will be apparent from the following description, reference being had to the accompanying drawings wherein a preferred embodiment of the present invention is clearly shown.

The resilient mounting of a motor or a generator generally comprises a cradle having two spaced uprights between and by means of which the electric motor or generator is held suspended. Such a mounting is clearly illustrated in the patent to Smith et al., No. 2,047,838, and issued July 14, 1936. As shown in this patent the two speed uprights of the cradle are each adapted to receive a resilient mounting element which consists of an outer metallic ring in which a resilient annulus is secured. In this patented arrangement, the electric motor has hub portions at each end which fit into the respective annuluses, thereby resiliently supporting the motor in the cradle. A suitable clamp fits upon each standard to hold the resilient mount thereon in position.

Figure 3:
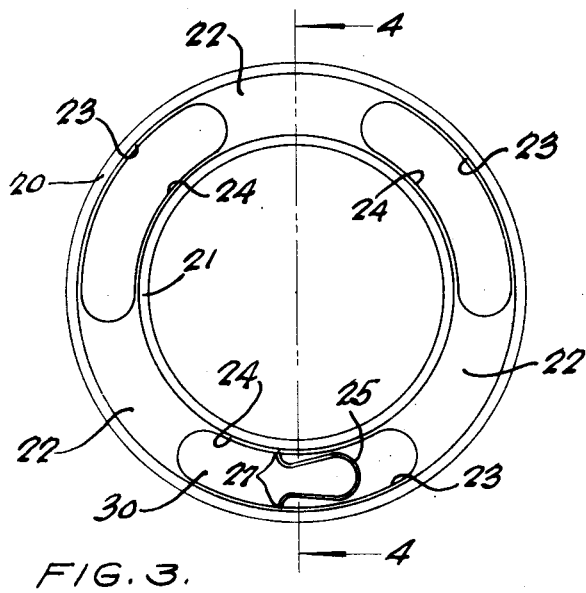
Fig. 3 is an end view of a motor mount equipped with the present invention.
Figure 4:
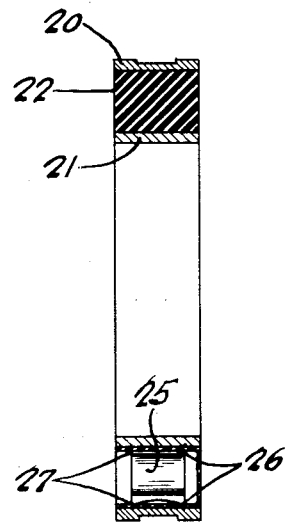
Fig. 4 is a sectional view taken along the line and in the direction of the arrows 4—4 of Fig. 3, the grounding clip being shown in elevation.

The resilient mount illustrated in the Figs. 3 and 4 of the present drawings is constructed slightly different from the one shown in the aforementioned patent. It is adapted, however, to be applied to the same type of cradle and supports the motor in the same manner as the patented device.

Referring to the drawings, the numeral 20 designates the outer, metallic ring of the resilient mount. A smaller, inner ring 21 is held in concentricity with the outer ring by resilient means interposed between and secured to both the inner and outer rings. This resilient means consists of a plurality of spaced blocks 22 of rubber or any other similar resilient material held in annularly spaced relation by comparatively thin web portions 23 and 24 so as to be insertable between the two rings 20 and 21 as a unit after which said unit is vulcanized to the said rings to secure the surfaces of the rubber unit to the adjacent ring surfaces.

The inner ring 21 fits about a hub on the electric motor while the outer ring is clamped in the one upright of the motor supporting cradle. The element between the two rings being made of rubber or a similar resilient material, completely insulates the electric motor from the metallic cradle and thus any static electricity generated in the motor by belt and pulley friction or otherwise cannot be dissipated by escape to the grounded cradle.

Complicated and expensive means such as flexible pig tails soldered to and connecting both rings 20 and 21, conducting material mixed with the rubber to render it conductive of electricity, conductor inserts molded in the rubber and contacting the metal rings, and other similar devices have been used to provide conducting means for the static charge from the motor to the grounded cradle. Such means are not only expensive, but if rendered inoperative or non-conductive for any reason, necessitate the complete removal and replacement of the resilient mounting element.

The present invention provides an exceedingly simple and inexpensive replaceable device for performing the necessary function of connecting the motor engaging ring 21 with the grounded ring 20 contacting the cradle.

Figure 1:
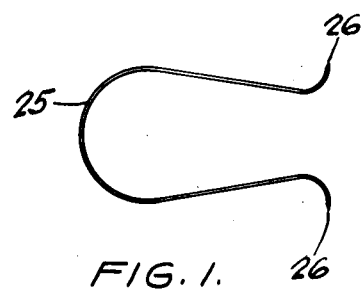
Fig. 1 is an edge view of the hairpin-shaped, resilient grounding clip.
Figure 2:
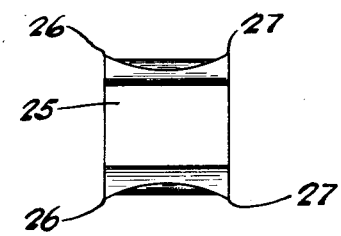
Fig. 2 is an end view of the clip, showing its sharp, insulation piercing corners.

As shown in Figs. 1 and 2, the device consists of a hairpin-shaped clip 25 made of resilient spring material having the required electrical conducting properties. The two ends of the clip 25 are bent outwardly, in opposed directions as shown in Fig. 1. The outer ends of the clip are respectively recessed concavedly so that sharp points 26 and 27 are provided at the respective corners of each end.

To place a clip 20 in position, the operator grasps the clip by means of pliers adjacent the outwardly turned ends of the clip and then presses the two ends together so that the clip may be introduced into a space 30 between any two adjacent blocks 22. When the clip is in proper position in said space the compressing pliers are released and the clip will return to normal, the two ends moving outwardly. As the ends move outwardly, away from each other, their respective sharp points 26 and 27 will pierce the thin wall, membraneous rubber 23 and 24 respectively and bite into and make electrical conductive contact with the adjacent metallic rings 20 and 21 respectively. Now said inner, motor engaging ring is electrically connected with the outer ring carried by and contacting with the grounded cable so that any static electricity in the motor can escape through said clip to ground. If, for any reason, the clip 25 fails to ground the motor, it may readily be removed by pliers and another be applied in any one of the spaces between adjacent blocks 22.

From the aforegoing it may be seen that the present invention provides a simple and inexpensive grounding means for resilient mounts for electric motors or generators said means being easily applied and readily replaced if necessary.

While the embodiment of the present invention as herein disclosed, constitutes a preferred form, it is to be understood that other forms might be adopted.

What is claimed is as follows:

1. In combination with a mounting member for supporting an electrical machine, said mounting member consisting of two metal rings held concentrically spaced by resilient insulating blocks secured in spaced relation between said rings, a resilient spring clip removably inserted in a space between said blocks so as electrically to engage and connect the rings, said clip being hairpin shaped, the outer ends having oppositely disposed, outwardly extending barbs biting into the respective rings.

2. A short-circuited mounting member for supporting an electric machine on a metal standard, said mounting member consisting of a metal ring adapted to fit about a portion of the electric machine, a larger diameter metal ring adapted to be secured in the metal standard; spaced resilient insulating blocks interposed between said rings for holding them substantially concentrically spaced, and a metallic, hairpin-shaped spring clip having outwardly extending and oppositely disposed barbs at its ends, said clip being removably inserted into a space between the resilient blocks for electrically connected the metal rings.

RALPH K. SHEWMON.

REFERENCES CITED

The following references are of record in the file of this patent:

UNITED STATES PATENTS

| Number | Name | Date |
|---|---|---|
| 1,671,407 | Codney | May 29, 1928 |
| 2,047,838 | Smith | July 14, 1936 |
| 2,136,555 | Loftis | Nov. 15, 1938 |
| 2,164,381 | Bradley | July 4, 1939 |
| 2,291,623 | Hanson | Aug. 4, 1942 |
| 2,296,221 | Pontis | Sept. 15, 1942 |
| 2,534,881 | Schroeder | Dec. 19, 1950 |

FOREIGN PATENTS

| Number | Country | Date |
|---|---|---|
| 588,072 | England | May 13, 1947 |